United States Patent
Baudart et al.

(10) Patent No.: US 9,664,924 B2
(45) Date of Patent: May 30, 2017

(54) METHOD FOR PROCESSING AN UNFINISHED OPTICAL LENS MEMBER FOR MANUFACTURE OF AN OPTICAL LENS

(71) Applicant: ESSILOR INTERNATIONAL (COMPAGNIE GENERALE D'OPTIQUE), Charenton-le-pont (FR)

(72) Inventors: Thierry Baudart, Charenton-le-pont (FR); Virginie Martin, Charenton-le-pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 160 days.

(21) Appl. No.: 14/407,600

(22) PCT Filed: Jul. 19, 2013

(86) PCT No.: PCT/EP2013/065346
§ 371 (c)(1),
(2) Date: Dec. 12, 2014

(87) PCT Pub. No.: WO2014/013072
PCT Pub. Date: Jan. 23, 2014

(65) Prior Publication Data
US 2015/0138501 A1    May 21, 2015

(30) Foreign Application Priority Data
Jul. 20, 2012  (EP) .................................... 12305890

(51) Int. Cl.
*G02C 3/00*    (2006.01)
*G02C 7/00*    (2006.01)
(Continued)

(52) U.S. Cl.
CPC .............. *G02C 7/027* (2013.01); *B24B 9/148* (2013.01); *B24B 13/0055* (2013.01); *G02C 7/02* (2013.01)

(58) Field of Classification Search
CPC ... B24B 13/0055; B24B 13/005; B24B 13/06; B24B 9/148; B24B 9/146; G02C 7/02; G02C 7/027; G05B 19/40937
(Continued)

(56) References Cited

U.S. PATENT DOCUMENTS

| 4,781,452 A | * | 11/1988 | Ace | ......................... B24B 9/148 351/159.74 |
| 2008/0007690 A1 | * | 1/2008 | Mazoyer | ................. B24B 9/148 351/159.19 |

OTHER PUBLICATIONS

International Search Report, dated Oct. 30, 2013, from corresponding PCT application.

\* cited by examiner

*Primary Examiner* — Scott J Sugarman
*Assistant Examiner* — Mustak Choudhury
(74) *Attorney, Agent, or Firm* — Young & Thompson

(57) ABSTRACT

A method of processing an unfinished optical lens member having a finished surface with a center reference point, and first and second surfaces, includes providing contour data defining the contour of the first surface in a finished cut state, the maximum distance between two points of the contour defined by $C_{max}$; determining, an optical reference point of the first surface with respect to the contour, the optical reference point corresponding to a user's line of sight in the finished cut state, the maximum distance between the optical reference point and the contour defined by $M_{max}$, providing a first surface dataset defining the second surface with respect to the optical reference point; and providing an unfinished optical lens member having a minimum distance (Continued)

$R_{SF}$ between the center reference point and the boundary of the unfinished lens member such that $2\ R_{SF} \geq C_{max}$ and $R_{SF} < M_{max}$.

13 Claims, 6 Drawing Sheets

(51) Int. Cl.
    *G02C 7/02*        (2006.01)
    *B24B 13/005*    (2006.01)
    *B24B 9/14*       (2006.01)

(58) Field of Classification Search
    USPC .............. 359/159.74, 159.75, 159.76, 159.8,
                            359/159.81, 177, 159.19, 159.78;
                                   700/117, 174–177; 29/281.4
    See application file for complete search history.

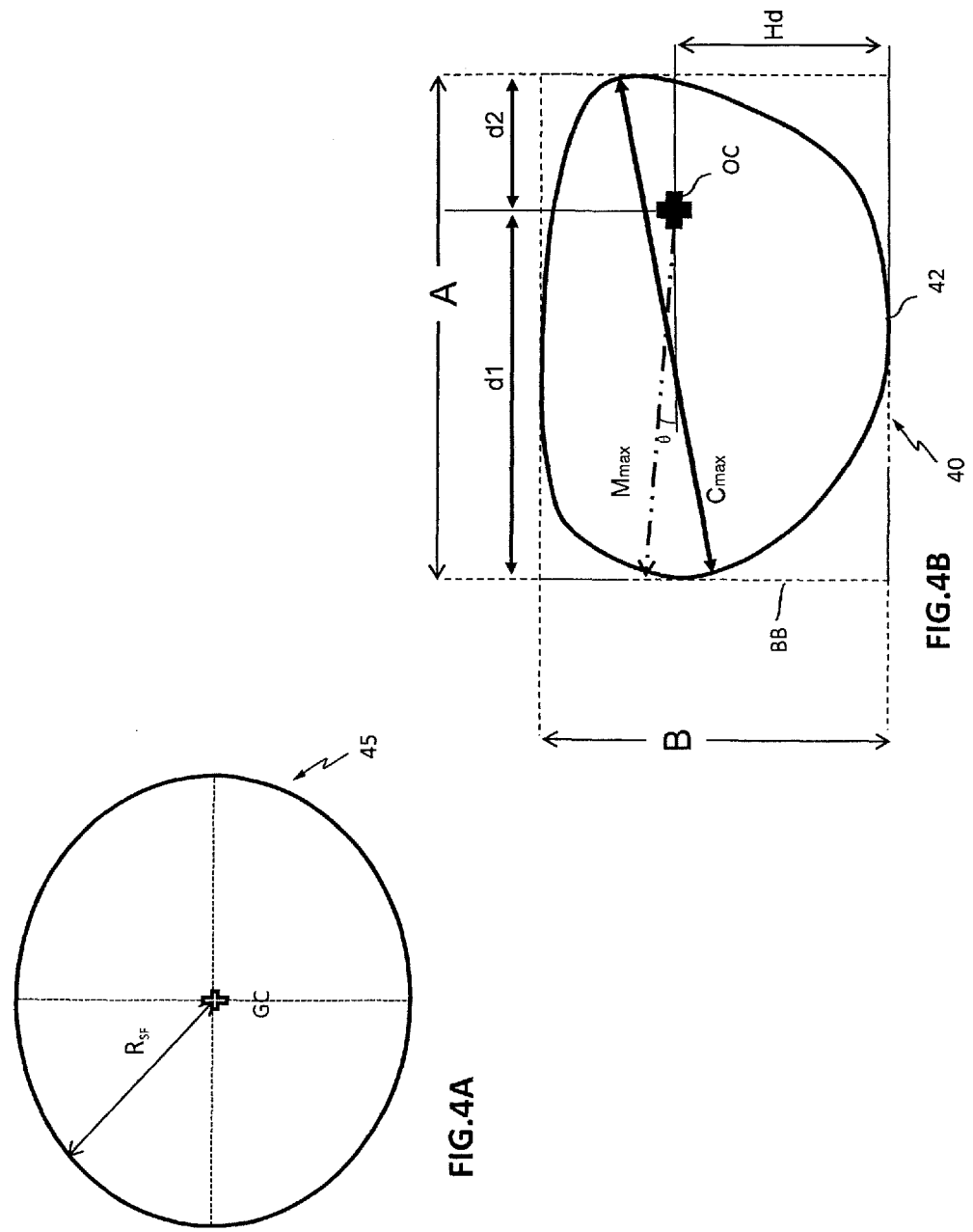

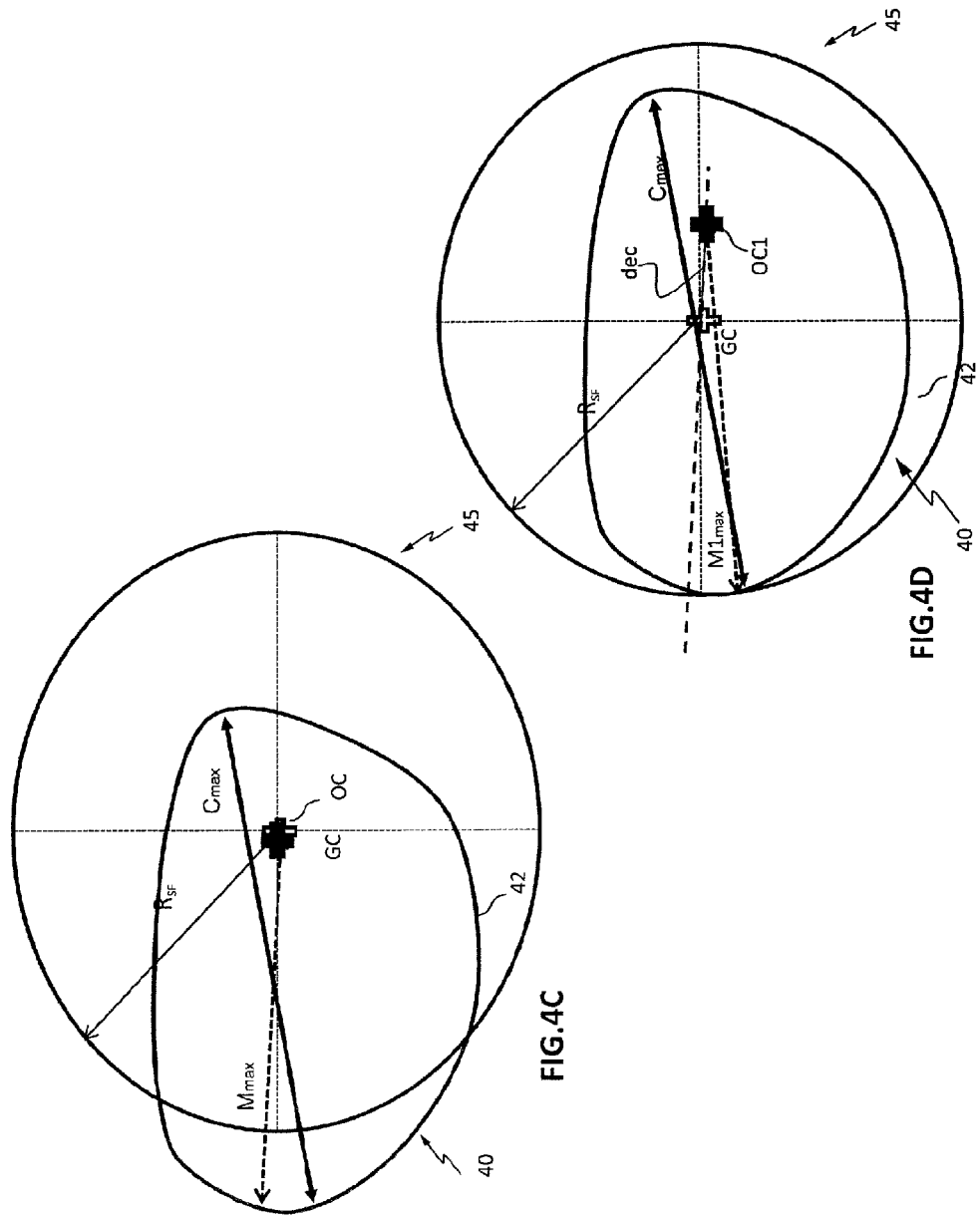

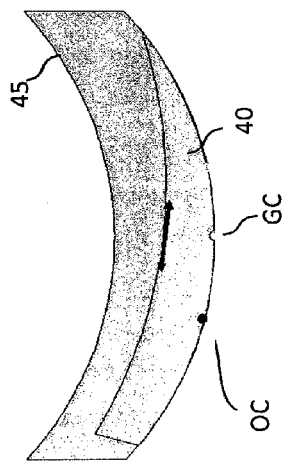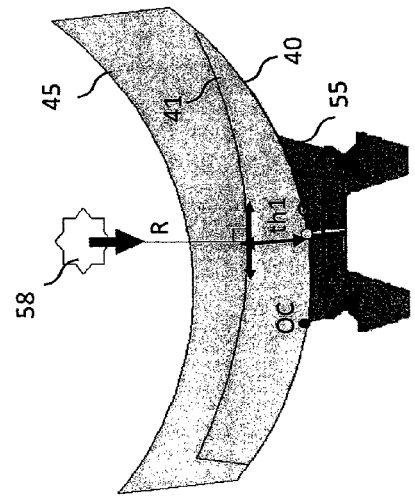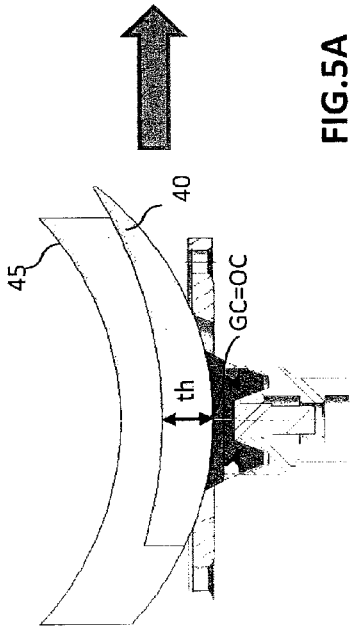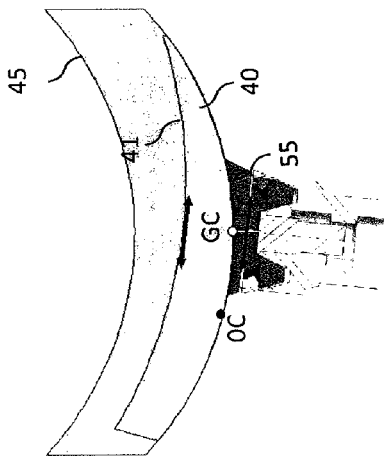
FIG.5A
FIG.5C
FIG.5B

METHOD FOR PROCESSING AN UNFINISHED OPTICAL LENS MEMBER FOR MANUFACTURE OF AN OPTICAL LENS

BACKGROUND OF THE INVENTION

The present invention concerns a method for processing an unfinished optical lens member for manufacture of an optical lens.

DESCRIPTION OF THE RELATED ART

An optical lens is generally manufactured in accordance with user specifications. In the case, for example, of an ophthalmic lens for the correction or improvement of eyesight, the ophthalmic lens is manufactured according to a user prescription corresponding to the visual requirements of that user. In addition, the shape and size of the spectacle frame supporting the ophthalmic lens is taken into account. At least one of the major surfaces of the ophthalmic lens is processed to provide an ophthalmic lens according to the user prescription. The contour of the finished ophthalmic lens is edged according to the shape of the spectacle frame on which the ophthalmic lens is to be mounted.

An optical lens is generally manufactured from an unfinished optical lens member such as a semi-finished lens blank. A semi-finished lens blank generally has two opposing major surfaces at least one of which is unfinished. The unfinished surface is typically the surface corresponding to the back surface of the optical lens which, in use, is orientated towards the eye of the user. The unfinished surface of the semi-finished lens blank is then processed according to the user's prescription to provide the required surface of the optical lens. An optical lens having finished back and front surfaces is often referred to as an uncut optical lens. The uncut optical lens is then edged according to a shape of a frame of the optical lens in order to obtain an edged or cut lens.

During processing of an optical lens, an optical reference point is defined on a surface, typically the finished surface, of the unfinished optical member to provide a reference for when the finished optical lens is installed on a frame. The optical reference point, often referred to as the optical centre, is defined from the point of an intersection of the primary gaze position, coincident with a pupil position of a user, and the front surface of the optical lens when mounted on a frame worn by the user. In the case where the optical lens includes a prism, the optical reference point defines the point on the front surface of the optical lens at which the prismatic effect of the finished optical lens is determined. Such a reference point is often referred to as the prism reference point (PRP).

When the lens is a unifocal lens, the optical reference point is located at the same position as the fitting cross. When the lens is progressive addition lens, the optical reference point is determined from the position of the fitting cross, for example the optical reference point is located 4 mm below the fitting cross and spaced 2.5 mm laterally on the nasal side of the lens.

The fitting cross is a temporary marking written on the finished surface of the unfinished optical lens member and on the finished surface of the optical lens. If the temporary markings are absent or have been erased, it is always possible for a skilled person to position the control points on the lens by using a mounting chart and permanent micro-markings.

An example of a semi-finished lens blank from which an optical lens is manufactured is illustrated in FIG. 1. The semi-finished lens blank 11 has a generally cylindrical shape. The contour 12 of the optical lens to be manufactured from the semi-finished blank 11 is outlined within the semi-finished blank, and the optical reference point OP of the optical lens is defined. The contour 12 which represents the edge of the finished optical lens is defined according to the shape of the frame supporting the optical lens In general, in order to facilitate processing during manufacture of the optical lens, the optical reference point OP of the finished optical lens 2 coincides with the geometrical centre reference point GC of the semi-finished lens blank 11.

The geometrical centre reference point GC corresponds to the intersection of the horizontal and vertical centrelines of an unfinished lens member. During manufacture of the optical lens the optical reference point OP and the geometrical centre reference point GC correspond in general to the rotational axis of the processing device for processing the unfinished surface of the optical lens.

In the case where the frame on which the optical lens is to be mounted is shaped such that the nasal (d2) and temporal (d1) distances, respectively defining the distance between the optical reference point and the nasal and temporal edges, are dissymmetric, a semi-finished blank 21 of significantly larger diameter is required in order to be of sufficient size to enable an optical lens of the required size to be obtained. However, this leads to wastage of the optical material of the unfinished lens member, as illustrated in FIG. 2. In some cases in order to enable such large diameter dissymmetric optical lenses to be produced from standard sized semi-finished lens blanks the optical reference point of the optical lens to be manufactured is offset from the geometrical central reference point of the semi-finished lens blank by a constant decentering value, ie. without any connection with the frame shape. During processing of the unfinished surface of the optical lens, the semi-finished lens blank is blocked at the optical reference point such that the optical reference point coincides with the rotational axis of the processing device for processing the unfinished surface of the lens. However, the processing steps of the manufacture of the optical lens are not geometrically centered leading to problems such as uneven surfacing, polishing etc. Moreover the amplitude of the decentering is also limited by processing limitations.

With the increasing trend to larger and larger spectacle frames, for example wrap or shield style spectacle frames the problem of producing optical lens from unfinished lens member is exacerbated.

Typically a set of semi-finished lens blanks made up of 4 types of semi-finished lens blanks having different diameters is used, for example 50 mm, 60 mm, 70 mm, and 80 mm. Each of these diameters corresponds to a size range of optical lenses to be manufactured. Generally a semi-finished lens of 70 mm diameter is used to provide a non-decentered lens suitable for being fitted in a given spectacle frame. The greater the number of different types of semi-finished lens blank in a set, the more costly is the management of the manufacture of optical lenses.

SUMMARY OF THE INVENTION

The present invention has been devised to address one or more of the foregoing concerns.

According to a first aspect of the invention there is provided a method of processing an unfinished optical lens member for manufacture of an optical lens from the unfinished optical lens member, the unfinished optical lens member being provided with a finished surface having a geometrical centre reference point, the optical lens having a first and a second surface, said first surface being comprised in the finished surface of the unfinished optical lens member, the method comprising:

provinding contour data defining the contour of the first surface of the optical lens in a finished cut state, the maximum distance between two points of the contour being defined by a distance $C_{max}$;

determining, an optical reference point of the first surface of the optical lens with respect to the contour, said optical reference point corresponding to the line of sight of a user of the optical lens in the finished cut state, the maximum distance between the optical reference point and the contour being defined by a distance $M_{max}$, providing a first surface dataset defining the second surface with respect to the optical reference point;

providing an unfinished optical lens member having a minimum distance $R_{SF}$ between the geometrical centre reference point and the boundary of the unfinished optical lens member such that $2 R_{SF} \geq C_{max}$ and $R_{SF} < M_{max}$;

virtually offsetting the optical reference point of the optical lens on said first surface with respect to the geometrical centre reference point of the unfinished optical lens member such that when the contour of the optical lens is offset in correspondence with the offset optical reference point, said offset contour is within the boundaries of the unfinished optical lens member; and transforming the first surface dataset into a second surface dataset defining the second surface with respect to the virtually offset optical reference point.

By virtually offsetting is meant determining the position of the optical lens yet to be manufactured within the unfinished lens member such that the determined optical reference point on the first surface of the optical lens, is offset with respect to the geometrical centre reference point of the unfinished lens member from which the optical lens is manufactured.

In an embodiment of the invention the method further comprises blocking the unfinished optical lens member such that a rotation axis of a lens processing device for processing the unfinished surface of the unfinished optical lens member to provide the second surface of the optical lens according to said second surface dataset corresponds to a line perpendicular to said second surface of the optical lens passing through the geometrical centre reference point.

In an embodiment of the invention the method further comprises transforming the second surface dataset to compensate for a limitation of the virtual offset amplitude.

In an embodiment of the invention the optical reference point is offset with respect to the geometrical centre reference point such that the offset contour of the optical lens is tangential to at least one point of the boundaries of the unfinished optical lens member.

In an embodiment of the invention the method further comprises determining a prism configuration for inclining the unfinished optical lens member during blocking such that the plane tangential to second surface of the optical lens, at the intersection of the rotation axis of the lens processing device, is perpendicular to said rotation axis.

In an embodiment of the invention the geometry of the provided unfinished optical lens member is determined based on a required thickness of the optical lens at the optical reference point.

In an embodiment of the invention the finished surface of the unfinished optical lens member is spherical.

In an embodiment of the invention the optical lens member is rotationally symmetrical.

In an embodiment of the invention the optical lens is an ophthalmic lens for correcting eyesight.

In an embodiment of the invention the contour data is determined from the geometry of the frame supporting the ophthalmic lens.

In an embodiment of the invention the optical reference point is virtually offset from the geometrical central reference point on the first surface by a distance greater than 2.5 mm.

One aim of the invention is to modify the range of semi-finished lens blanks. For example, a new range of semi-finished lens blanks comprising 3 types of semi-finished lens blanks having respective diameters of 50 mm, 65 mm 80 mm may be provided. A semi-finished lens blank of 65 mm diameter enables the manufacture of an optical lens having an optical reference point offset with respect to the geometrical central reference point in accordance with the first aspect of the invention. This provides an industrial advantage since the smaller the range of semi-finished lens blanks the less costly is the management of the manufacture of optical lens.

In another example, a new range of semi-finished lens blanks comprises 4 types of semi-finished lens blanks having respective diameters of 50 mm, 65 mm 80 mm and 95 mm. This is advantageous in that from this new set of semi-finished lens blanks, by virtue of the decentering of the optical reference point with respect to the geometrical central reference point, optical lens of sizes superior to those without any decentering of the optical reference point can be manufactured. This provides an industrial and commercial advantage since the success of wrap and shield type frames tends to lead to the usage of dissymmetrical optical lenses of large dimension.

A further aspect of the invention provides an optical lens manufactured from an unfinished optical lens member according to the method of any embodiment of the first aspect of the invention.

An optical lens resulting from the method of one or more embodiments of the invention is designed to be the same as an optical lens manufactured to the same specification from an unfinished optical lens member of infinite size.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device or the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWING FIGURES

Embodiments of the invention will now be described, by way of example only, and with reference to the following drawings in which:

FIGS. 4A to 4D are schematic planar view from above of an unfinished lens member and an optical lens in accordance with an embodiment of the invention;

FIGS. 5A to 5C schematically illustrate steps of processing an unfinished lens member according to an embodiment of the invention;

DETAILED DESCRIPTION OF THE INVENTION

A method of processing an unfinished lens member for manufacture of an optical lens, according to an embodiment of the invention will be described with reference to FIGS. 3 to 5C.

Figure 1:
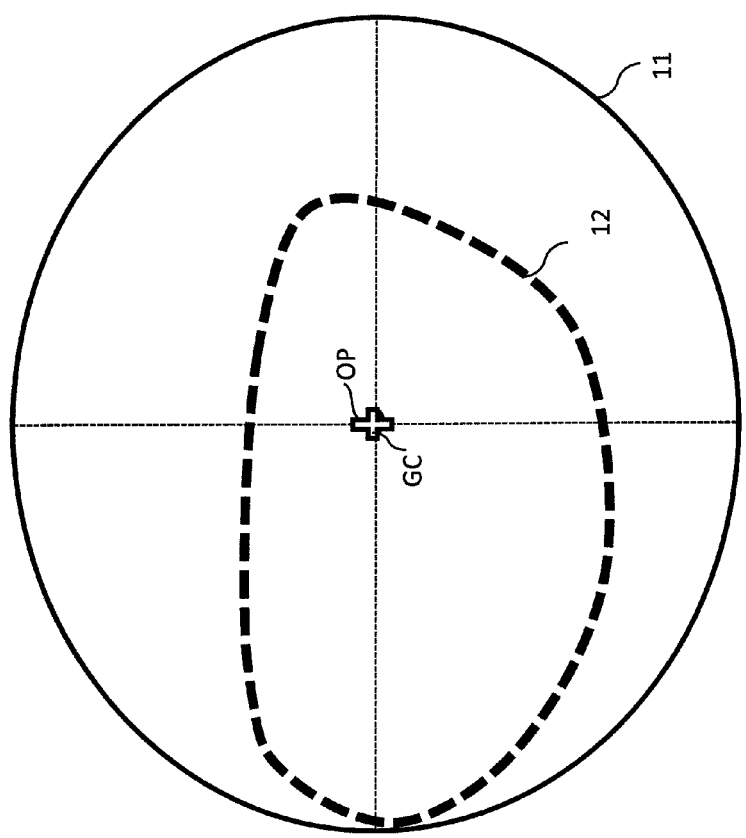
FIGS. 1 and 2 are schematic planar views from above of semi-finished lens blanks of the prior art.
Figure 2:
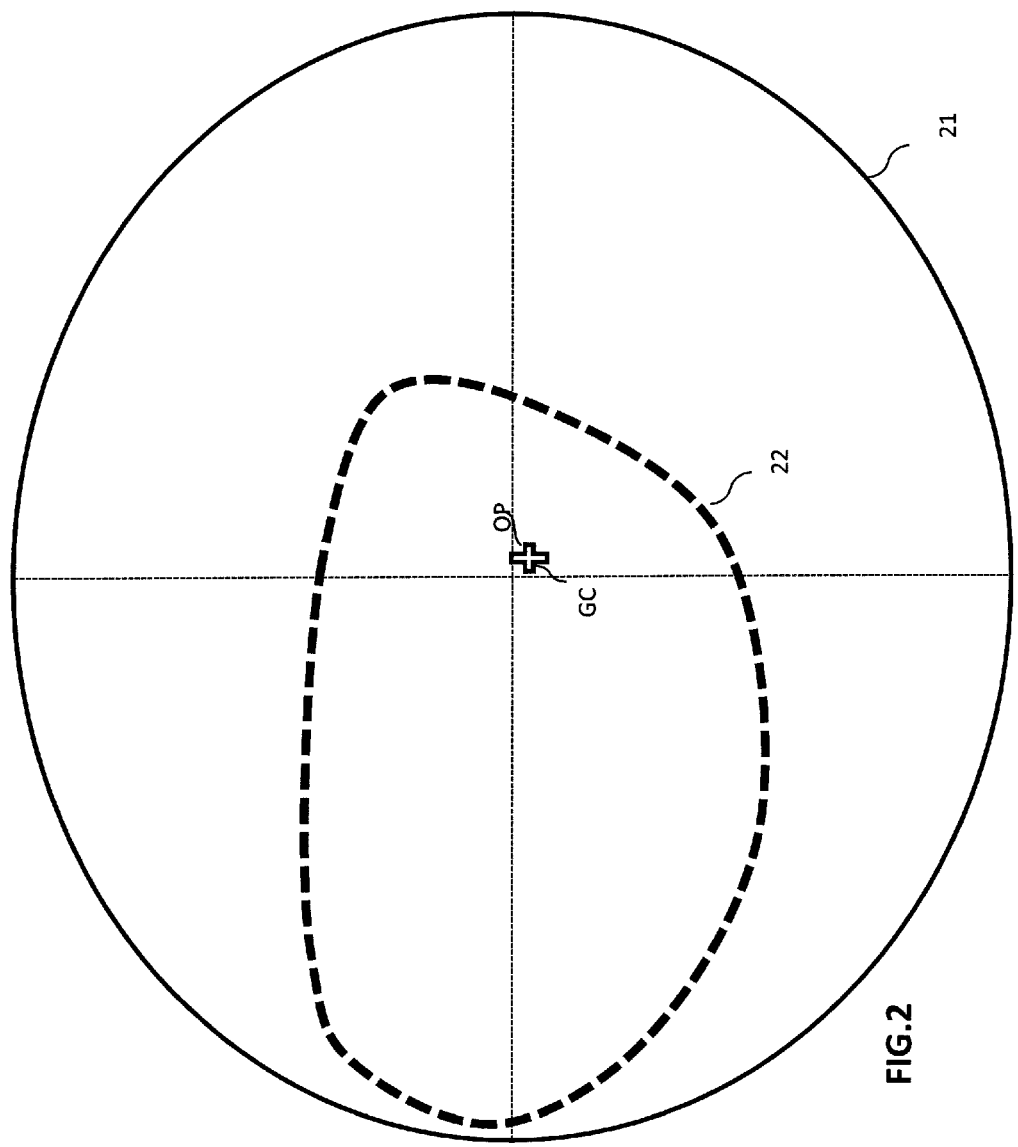
Figure 3:
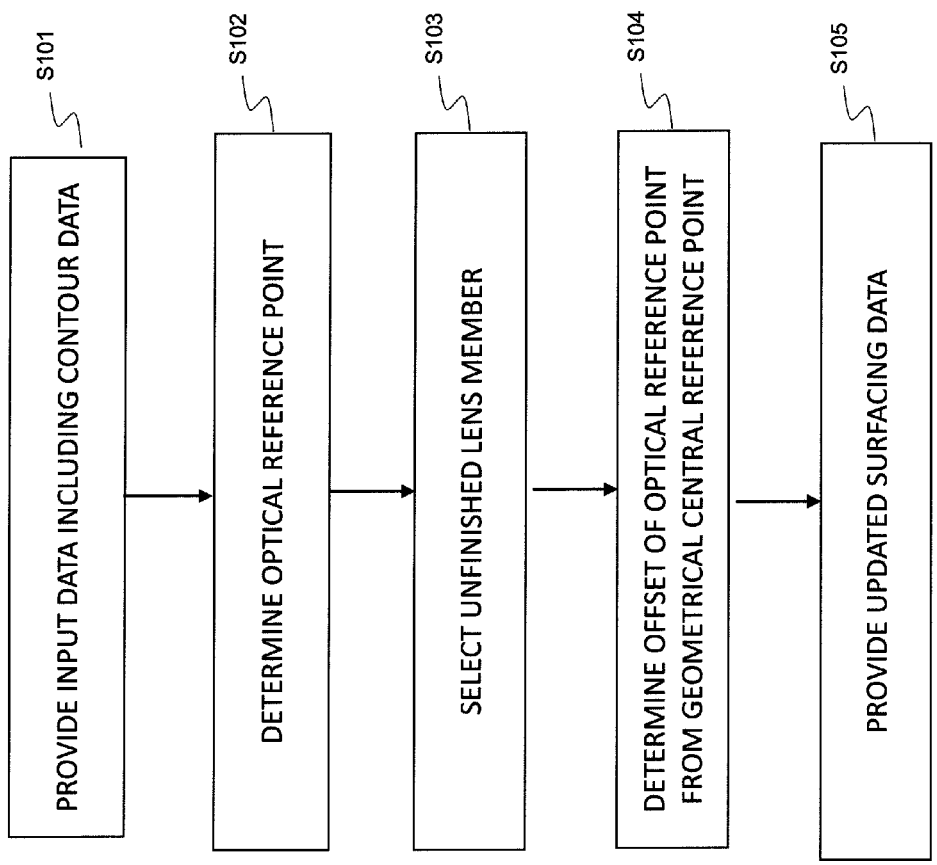
FIG. 3 is a flow chart illustrating steps of processing an unfinished lens member according to an embodiment of the invention.

FIG. 3 is a flowchart illustrating steps of a method of processing an unfinished lens member for manufacture of an ophthalmic lens according to an embodiment of the invention. In this embodiment the unfinished lens member is a semi-finished optical lens blank having a finished surface corresponding to the front surface of the ophthalmic lens to be manufactured, and an unfinished surface corresponding to the back surface of the ophthalmic lens. A geometrical centre point GC is defined on the front surface of the semi-finished optical lens blank which corresponds to the intersection of the horizontal and vertical centrelines of the shape of the semi-finished optical lens blank, as illustrated in FIG. 4A.

In an initial step S101 contour data C defining the contour of the front surface of the ophthalmic lens in a finished cut state is provided. This contour data may be based on the choice of spectacle frame in which the finished ophthalmic lens is to be mounted, for example.

The maximum distance between two points of the contour of the ophthalmic lens defined by a distance $C_{max}$ is provided as a geometrical parameter of the ophthalmic lens, as illustrated in FIG. 4B. This geometrical parameter is for example determined from the contour data C.

The bounding box of the contour of the ophthalmic lens defined by a width A and a height B is provided as a geometrical parameter of the ophthalmic lens, as illustrated in FIG. 4B.

A subsequent step S102 of the method includes determining, with respect to the contour of the front surface of the finished ophthalmic lens, an optical reference point of the front surface of the ophthalmic lens. The optical reference point OC is defined from the line of sight of the user of the finished ophthalmic lens mounted in the selected frame, as detailed above.

The position of the optical reference point OC with respect to the contour is provided, for example in the form of a first distance Hd from the bottom of the bounding box BB and of a second distance d2 from the nasal edge of the bounding box BB.

The maximum distance between the optical reference point OC and the contour of the front surface of the ophthalmic lens is defined by a distance $M_{max}$ where $M_{max}=\text{Max}(C(\theta))$, $\theta$ being the radial angle from the optical reference point OC at which the maximum distance is obtained. The contour $\rho=C(\theta)$ may be expressed in a reference framework centered on the optical reference point OC, and expressed in polar co-ordinates $(\rho, \theta)$.

A first surface dataset in the form of a first surface data file defining the back surface of the ophthalmic lens with respect to the optical reference point OC of the front surface of the ophthalmic lens is provided.

An example of the contour 42 of a finished ophthalmic lens is illustrated in FIG. 4B. In this example the finished ophthalmic lens 40 has a dissymmetric shape in which the distance d1 between the optical reference point OC and the temporal edge of the bounding box is significantly greater than the distance d2 between the optical reference point OC and the nasal edge of the bounding box.

In step S103 a semi-finished lens blank is selected for providing the desired ophthalmic lens having a contour C and the optical reference point OC. The semi-finished lens blank is selected depending on the minimum distance $R_{SF}$ between the geometrical centre point of the semi-finished lens blank and the outer edge of the semi-finished lens blank, as illustrated in FIG. 4A. In a cylindrical shaped semi-finished optical lens member distance $R_{SF}$ corresponds to the geometrical radius of the semi-finished optical lens member. A semi-finished optical lens member having distance $R_{SF}$ is selected such that $2R_{SF} > C_{max}$ i.e. the diameter of the semi-finished lens blank should be greater than the maximum distance $C_{max}$ between two points of the contour of the finished ophthalmic lens so that the semi-finished lens blank is sufficiently large to produce the ophthalmic lens. Accordingly, the finished ophthalmic lens defined by the contour data C fits within the semi-finished lens blank. In terms of the bounding box parameters of the desired ophthalmic lens the distance $R_{SF}$ of the semi-finished optical lens member should be such that $\sqrt{A^2+B^2} < 2R_{SF}$.

In addition, the distance $R_{SF}$ of the selected semi-finished lens blank should satisfy the condition $R_{SF} < M_{max}$. This enables there to be less wastage of the semi-finished lens blank.

The conditions $R_{SF} < M_{max}$ and $C_{max} < 2R_{SF}$ may be met by offsetting in step S104 the position of the optical reference point OC of the finished ophthalmic lens within the semi-finished lens blank 45, as illustrated in FIGS. 4C and 4D with respect to the geometrical centre reference point GC of the semi-finished lens blank 45 such that $R_{SF} < M_{max}$ and the contour of the finished ophthalmic lens 40 is within the outer boundaries of the semi-finished lens blank 45. The offset dec is calculated as $R_{SF} - M_{max}$. Accordingly the ophthalmic lens is virtually positioned within the semi-finished lens blank such that the optical reference point OC is offset to a point OC1 from the geometrical centre reference point by a distance $R_{SF} - M_{max}$ in a direction $\theta+\pi$ such that $R_{SF} < M_{max}$ and $2R_{SF} > C_{max}$, and the ophthalmic lens 40 is fully contained within the semi-finished lens blank 45. Preferably the offset contour of the displaced ophthalmic lens is tangential to at least one point of the boundaries of the unfinished lens member. The contour defined by contour data C1 is then expressed with respect to the displaced optical reference point OC1 It is verified that $C1(\theta)+C1(\theta+\pi) < 2R_{SF}$ for all $0 < \theta < \pi$.

In the case where this condition is not met then another semi-finished block having a greater distance $R_{SF}$ is selected. The offset distance dec is typically less than 7.5 mm, and preferably less than 15 mm.

In step S105 the first surface dataset is transformed into a second surface dataset defining the back surface of the ophthalmic lens with respect to the offset optical reference point OC1. The back surface is thus defined with respect to the new shifted reference framework, defined by the shifted optical reference point OC1 with respect to the geometrical centre reference point GC. The second surfacing dataset is thereby defined for processing the shifted back surface of the offset ophthalmic lens, which is virtually displaced with respect to the semi-finished lens blank, so that machining and polishing of the lens manufacturing process may be optimised.

During manufacturing, the back surface of the semi-lens blank is processed in accordance with the second surface dataset in order to provide an ophthalmic lens corresponding to the requirements of the prescription. Processing of the back surface includes steps of machining and polishing the back surface.

A virtual angle of rotation for the offset ophthalmic lens in the semi-finished optical lens blank is determined with respect to the angle of rotation which would have been used if the optical reference point OC coincided with the geometrical central reference point GC. The virtual or displaced angle of rotation determined as a function of the offset distance dec. A new surfacing data file is defined in a framework orientated in such a manner to take account of the virtual rotation.

For optimised processing of the back surface it is desirable to have the back surface of the offset ophthalmic lens orientated perpendicular to the axis of rotation of the surface processing tool. For compensating the offset of the optical reference point OC in respect with the geometrical centre reference point GC a prism, referred to as an offset prism is implemented by means of blocking jig to compensate for the off-centering. The greater the value of the offset dec the greater is the value of the offset prism. Due to technical limits of manufacturing machines a maximum offset prism value is imposed, for example the offset prism is less or equal to 5°. It is advantageous to limit the amplitude of the offset distance dec in order limit the offset prism and to maintain an increased latitude of the offset prism. The thickness th of the ophthalmic lens at the blocking position must be calculated in order that the thickness of the ophthalmic lens at the displaced optical reference point corresponds to the prescription requirements.

Thus manufacturing of the offset ophthalmic lens virtually displaced within the semi-finished lens blank requires the following data:
- the second surface dataset defining the back surface of the offset ophthalmic lens with respect to the offset framework defined by the virtually offset optical reference point OC,
- the prism to use during the blocking of the semi-finished lens blank to ensure the back surface of the ophthalmic lens to be manufactured is perpendicular to the axis of rotation of the processing tool; and
- the new thickness of the ophthalmic lens at the blocking location FIG. 5A schematically illustrates offsetting of the ophthalmic lens 40 within the semi-finished lens blank 45 in accordance with step S104 of FIG. 3 from the initial situation (right side of the figure) where the optical reference point OC coincides with the geometrical centre reference point GC to the final situation (left side of the figure) where the optical reference point OC is offset with respect to the geometrical centre reference point GC. FIG. 5B schematically illustrates the offset prism 55 used to block the semi-finished lens blank 45 at the geometrical centre reference point GC so that the back surface 41 of the ophthalmic lens 40 within the semi-finished lens blank 45 is orientated to be perpendicular to the rotation axis R of the surface processing tool 58 during machining as illustrated in FIG. 5C. The machining and polishing of the back surface 41 of the ophthalmic lens can thus be centered geometrically thereby providing improved processing of the back surface of the ophthalmic lens.

Although the present invention has been described hereinabove with reference to specific embodiments, the present invention is not limited to the specific embodiments, and modifications will be apparent to a skilled person in the art which lie within the scope of the present invention.

For instance, while some specific embodiments have been described above in the context of an ophthalmic lens it will be appreciated that the invention may be applied to other optical substrates used as windows, automotive and aircraft windshields, films, ophthalmic instrumentation, computer monitors, television screens, telephone screens, multimedia display screens, lighted signs, light projectors and light sources, other ophthalmic devices and the like without departing from the scope of the invention. The ophthalmic devices may include eye glasses, sun glasses, goggles or the like.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of processing an unfinished optical lens member for manufacture of an optical lens from the unfinished optical lens member, the unfinished optical lens member being provided with a finished surface having a geometrical center reference point, the optical lens having a first and a second surface, said first surface being comprised in the finished surface of the unfinished optical lens member, the method comprising:
providing contour data defining the contour of the first surface of the optical lens in a finished cut state, the maximum distance between two points of the contour being defined by a distance $C_{max}$;
determining, an optical reference point of the first surface of the optical lens with respect to the contour, said optical reference point being defined from the line of sight of a user of the optical lens in the finished cut state, the maximum distance between the optical reference point and the contour being defined by a distance Mmax,
providing a first surface dataset defining the second surface with respect to the optical reference point;
providing an unfinished optical lens member having a minimum distance RSF between the geometrical center reference point and the boundary of the unfinished optical lens member such that 2 RSF≥Cmax and RSF<Mmax;

virtually offsetting the optical reference point of the optical lens on said first surface with respect to the geometrical center reference point of the unfinished optical lens member such that when the contour of the optical lens is offset in correspondence with the offset optical reference point, said offset contour is within the boundaries of the unfinished optical lens member; and transforming the first surface dataset into a second surface dataset defining the second surface with respect to the virtually offset optical reference point.

2. A method according to claim 1, further comprising blocking the unfinished optical lens member such that a rotation axis of a lens processing device for processing the unfinished surface of the unfinished optical lens member to provide the second surface of the optical lens according to said second surface dataset corresponds to a line perpendicular to said second surface of the optical lens passing through the geometrical center reference point.

3. A method according to claim 2, further comprising transforming the second surface dataset to compensate for a limitation of the virtual offset amplitude.

4. A method according to claim 1 wherein the optical reference point is offset with respect to the geometrical center reference point such that the offset contour of the optical lens is tangential to at least one point of the boundaries of the unfinished optical lens member.

5. A method according to claim 1 further comprising determining a prism configuration for inclining the unfinished optical lens member during blocking such that the second surface of the optical lens, at the intersection of the rotation axis of the lens processing device, is perpendicular to said rotation axis.

6. A method according to claim 1 wherein the geometry of the provided unfinished optical lens member is determined based on a required thickness of the optical lens at the optical reference point.

7. A method according to claim 1 wherein the finished surface of the unfinished optical lens member is spherical.

8. A method according to claim 1 wherein the optical lens member is rotationally symmetrical.

9. A method according to claim 1, wherein the optical lens is an ophthalmic lens for correcting eyesight.

10. A method according to claim 9 wherein the contour data is determined from the geometry of the frame supporting the ophthalmic lens.

11. A method according to claim 1 wherein the optical reference point is virtually offset from the geometrical central reference point on the first surface by a distance greater than 2.5 mm.

12. A non-transitory computer program product for a programmable apparatus, the computer program product comprising a sequence of instructions for implementing a method according to claim 1 when loaded into and executed by the programmable apparatus.

13. A non-transitory computer-readable storage medium storing instructions of a computer program that, when implemented on a computer, causes the computer to implement the method of claim 1.

* * * * *